(12) United States Patent
Fagergren et al.

(10) Patent No.: US 12,243,356 B2
(45) Date of Patent: Mar. 4, 2025

(54) METHOD AND A SYSTEM FOR PREDICTING MAINTENANCE/REPLACEMENT PERIOD FOR A COMPONENT OF A VEHICLE

(71) Applicant: Volvo Truck Corporation, Gothenburg (SE)

(72) Inventors: Mats Fagergren, Kungälv (SE); Jan-Inge Svensson, Gothenburg (SE); Gustav Neander, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 551 days.

(21) Appl. No.: 17/439,076

(22) PCT Filed: Mar. 22, 2019

(86) PCT No.: PCT/EP2019/057325
§ 371 (c)(1),
(2) Date: Sep. 14, 2021

(87) PCT Pub. No.: WO2020/192879
PCT Pub. Date: Oct. 1, 2020

(65) Prior Publication Data
US 2022/0148342 A1    May 12, 2022

(51) Int. Cl.
*B60W 50/10* (2012.01)
*B62D 15/02* (2006.01)
*G07C 5/00* (2006.01)

(52) U.S. Cl.
CPC .............. *G07C 5/006* (2013.01); *B60W 50/10* (2013.01); *B62D 15/0235* (2013.01); *B60W 2510/202* (2013.01)

(58) Field of Classification Search
CPC ............ B60W 50/10; B60W 2510/202; B62D 5/0472; B62D 5/0481; B62D 15/0235;
(Continued)

(56) References Cited

U.S. PATENT DOCUMENTS

| | | | |
|---|---|---|---|
| 2008/0201041 A1* | 8/2008 | Jiang | H02P 21/04 318/632 |
| 2009/0000857 A1* | 1/2009 | Sugiyama | B62D 5/0472 180/444 |

(Continued)

FOREIGN PATENT DOCUMENTS

| | | |
|---|---|---|
| CN | 107031707 A | 8/2017 |
| CN | 108068881 A | 5/2018 |

(Continued)

OTHER PUBLICATIONS

International Search Report and Written Opinion for International Patent Application No. PCT/EP2019/057325, mailed Dec. 20, 2019, 14 pages.

(Continued)

*Primary Examiner* — Peter D Nolan
*Assistant Examiner* — Ce Li Li
(74) *Attorney, Agent, or Firm* — Withrow & Terranova, PLLC

(57) ABSTRACT

The invention relates to a method for predicting maintenance/replacement period for a component of a vehicle, the vehicle comprising a power-assisted steering system including a steering actuator (14) configured to assist in steering the vehicle at least as compensation for angular deviations of the road wheels (16) caused by road disturbances. The method comprises acquiring over time steering output data indicative of a magnitude and/or frequency of assisted steering as compensation for angular deviations of the road wheels (16) caused by road disturbances, comparing the acquired steering output data with stored component wear data, the stored component wear data being indicative of when maintenance/replacement of the component is due based on wear caused by road disturbances, and determining, based on the comparison of the acquired steering output data and the stored component wear data, whether or not (Continued)

maintenance/replacement of the component is due. The invention also relates to a system (10).

19 Claims, 5 Drawing Sheets

(58) Field of Classification Search
CPC .... B62D 15/025; B62D 15/029; G07C 5/006; G07C 5/008
See application file for complete search history.

(56) References Cited

U.S. PATENT DOCUMENTS

| | | | |
|---|---|---|---|
| 2017/0092021 A1 | 3/2017 | Nielsen et al. | |
| 2017/0349208 A1* | 12/2017 | Sugawara | B62D 5/0463 |
| 2018/0265127 A1 | 9/2018 | Walsh et al. | |
| 2020/0062304 A1* | 2/2020 | Park | F16F 7/00 |
| 2020/0086915 A1* | 3/2020 | Abele | B62D 15/029 |
| 2020/0172165 A1* | 6/2020 | Chen | B62D 15/025 |

FOREIGN PATENT DOCUMENTS

| | | |
|---|---|---|
| DE | 10360582 A1 | 7/2004 |
| DE | 102016125680 A1 | 7/2017 |
| DE | 102019124320 A1 | 3/2020 |
| EP | 2893294 B1 | 7/2017 |
| JP | 2006117205 A * | 5/2006 |
| WO | 2012035418 A1 | 3/2012 |

OTHER PUBLICATIONS

Intention to Grant for European Patent Application No. 19716086.4, mailed Oct. 13, 2022, 34 pages.
First Office Action for Chinese Patent Application No. 201980094287.X, mailed Dec. 5, 2022, 12 pages.

* cited by examiner

METHOD AND A SYSTEM FOR PREDICTING MAINTENANCE/REPLACEMENT PERIOD FOR A COMPONENT OF A VEHICLE

This application is a 35 USC 371 national phase filing of International Application No. PCT/EP2019/057325, filed Mar. 22, 2019, the disclosure of which is incorporated herein by reference in its entirety.

TECHNICAL FIELD

The invention relates to a method and a system for predicting maintenance/replacement period for a component of a vehicle.

The invention can be implemented for predicting maintenance/replacement period for components of heavy-duty vehicles, such as trucks, buses and construction equipment. However, the invention is not restricted to such vehicles, but may also be implemented for components of other vehicles such as passenger cars.

BACKGROUND

Vehicles, such as trucks, are sometimes used under conditions to which they were not intended to be used. For instance, a driver may decide to drive a truck on rough roads even though the truck was originally constructed, equipped and specified for smooth driving conditions. Such discrepancies between the specification, i.e. intended driving conditions, and the actual driving conditions, makes it difficult to predict the need for maintenance or replacement of various components of the truck. A truck exposed to rough roads, for example, very bumpy roads, will reduce the life of various components of the chassis or other parts of the vehicle. Some examples of components that will wear out quicker due to large road disturbances are springs, engine suspension, bellows, etc.

Some vehicles are equipped with air suspension ride height sensors, which may be used to estimate tear and wear in order to predict maintenance or replacement. However, it would be desirable to provide an improved method and system for predicting maintenance and/or replacement for a vehicle component.

SUMMARY

An object of the invention is to provide an improved method and a system for predicting maintenance or replacement for a component of a vehicle.

The object is achieved by a method and system according to the appended independent claims.

According to a first aspect of the invention, there is provided a method for predicting maintenance/replacement period for a component of a vehicle, the vehicle comprising a power-assisted steering system including a steering actuator configured to assist in steering the vehicle at least as compensation for angular deviations of the road wheels caused by road disturbances, the method comprising:
  acquiring over time steering output data indicative of a magnitude and/or frequency of assisted steering as compensation for angular deviations of the road wheels caused by road disturbances,
  comparing the acquired steering output data with stored component wear data, the stored component wear data being indicative of when maintenance/replacement of the component is due based on wear caused by road disturbances, and
  determining, based on the comparison of the acquired steering output data and the stored component wear data, whether or not maintenance/replacement of the component is due.

The invention is based on the realization, that the power-assisted steering system, which nowadays is very common in vehicles, may be used for predictive purposes. In particular, the inventors have realized that the operation of the power-assisted steering system may be analysed over time. In simplified terms, when a vehicle drives on a rough road having bumps and/or depressions, one or more road wheels would without steering assistance deviate angularly from the intended heading. A steering actuator of the power-assisted steering system is, however, configured to assist in steering the vehicle as compensation for such angular deviations. By analysing how much and/or how often the steering actuator compensates for such angular deviations, a good estimation is obtained of the roughness of the ground on which the vehicle has travelled and thus the forces that have affected components of the vehicle. The performance of the steering actuator may be monitored continuously/repeatedly, eg. by sampling output data over time, and because the compensation for the angular deviations is directly related to the roughness experienced by the wheels, a good predictability can be made when it comes to component wear and tear, and thus the period for maintenance/replacement of the component.

It should be understood that in this application (in order to avoid repeating lengthy terms and expressions) the term "component" can be an individual component such as a spring, a suspension part, a bellow, etc, however, it can also be a vehicle subsystem, such as the braking sub-system, the engine, the fuel-subsystem, etc. Accordingly, the invention can be used for predicting a maintenance period and/or a replacement period for a component in the form of an individual part or in the form of an aggregate of parts, such as a vehicle sub-system. It should also be understood that stored component wear data relates to the component or components for which the prediction is to be made. Vehicle manufacturers today have extensive databases, which may include empirically determined and collected wear data for various components.

According to at least one exemplary embodiment, said stored component wear data includes one or more thresholds of a first parameter value, wherein said steering output data includes first parameter values which have been converted from second parameter values generated by the steering actuator and being indicative of an assisted steering as compensation for road disturbances, wherein said step of comparing the acquired steering output data with stored component wear data comprises comparing the first parameter values of the steering output data with said one or more thresholds, and wherein said step of determining comprises determining that maintenance/replacement of the component is due when one or more of the converted first parameter values exceeds said one or more thresholds. This is advantageous since direct determination of first parameter values may be difficult to determine. For instance, the first parameter value may be an acceleration of the component as a function of number of repetitions of such an acceleration. Although acceleration sensors may be provided in the vehicle, it is very impractical to have acceleration sensors for each component for which you would like to predict the maintenance/replacement period. By instead making an indirect measurement of a second parameter values generated by the steering actuator (e.g. magnitude of torque), a transfer function may be used for converting it into comparable first parameter values. The contents of the transfer function may be different for different components, and may also depend on the location of the component on the vehicle (as a component located near a road wheel may be affected differently than a component located elsewhere). Thus, a single sensor or data collecting unit may be used, instead of having a sensor for each component. Hence, according to at least one exemplary embodiment, said steering output data includes first parameter values which have been converted, by the use of a transfer function, from second parameter values generated by the steering actuator and being indicative of an assisted steering as compensation for road disturbances.

According to at least one exemplary embodiment, said first parameter values is at least one of vertical, lateral and longitudinal acceleration of the component as a function of number of repetitions. This is advantageous since vehicle manufacturers normally have extensive data on component acceleration and its effect on component wear. It should be understood, that in some exemplary embodiments the first parameter values may include all three orthogonal coordinates, i.e. vertical acceleration, lateral acceleration and longitudinal acceleration, while in other exemplary embodiments, the first parameter values may include only two of the three directions of acceleration, or even just one of them, for instance, the vertical acceleration of the component.

According to at least one exemplary embodiment, the generated second parameter value is a measured torque value given by an electric motor of the steering actuator to compensate for road disturbances. This is advantageous, since the torque of the motor is easily measured and may provide an accurate representation of how much angular compensation that has been made.

According to at least one exemplary embodiment, the method further comprises the step of determining the magnitude of torque given by the electric motor, before the step of comparing the acquired steering output data with stored component wear data. By determining the magnitude of torque and using for instance a transfer function to determine the acceleration that the component or components of interest have been subjected to, an appropriate comparison can be made with the stored component wear data.

According to at least one exemplary embodiment, the method further comprises the step of generating a power spectrum by means of a frequency analysis, such as a Fourier analysis, on the torque given by the electric motor, in order to establish how much of the torque is at each frequency. The output from the analysis will be a number of frequencies with amplitude for each frequency. A number of frequency ranges and amplitude ranges may be defined. By determining the number of occurrences of a certain amplitude range in a certain frequency range parameter values may be calculated for each frequency range.

According to at least one exemplary embodiment, the method further comprises the steps of:
  defining a plurality of torque ranges,
  sampling the magnitude of torque given by the electric motor to obtain measured torque values,
  counting the number of samples within each one of said plurality of torque ranges, in order to establish said second parameter values. By this the second parameter values may easily be established, and may then be converted to values which can be compared with the stored component wear data.

According to at least one exemplary embodiment, the method further comprises acquiring over time velocity data indicative of the velocity of the vehicle, wherein the conversion of second parameter values into first parameter values is performed as a function of the velocity of the vehicle at the time the second parameter value was generated. This is advantageous, since taking the velocity into account will provide greater accuracy in the prediction. If the vehicle moves slowly over a bump, the component of interest will normally be less subjected to wear and tear compared to if the vehicle moves at high speed over a bump.

According to at least one exemplary embodiment, the steering actuator is configured to additionally assist in steering the vehicle in dependence of a desired steering activity by a driver, wherein said steering output data is a subset of total steering data which additionally includes data indicative of an assisted steering in dependence of a desired steering activity by a driver, wherein said step of acquiring steering output data, comprises filtering out said additional data form the total steering data. This is advantageous since it avoids noise emanating from assisted steering based on a driver's input. Thus, when the driver wants to make a turn on a smooth road surface, and therefore rotates the steering wheel, the power-assisted steering will only be in reaction to the driver's input. Consequently, it may for instance be determined that all the generated torque by the motor is generated due to the driver's input. However, if the driver wants to turn the vehicle on an uneven road surface, the generated torque will be the sum of the torque corresponding to the driver's input request (the driver's turning of the steering wheel) on the one hand, and the compensation for the angular deviation of one or more road wheels due to the uneven road surface on the other hand. Since it is possible to measure the driver's input, and since it is known how much power-assisted steering (e.g. magnitude of torque) the system should generate, it is possible to filter out this data from the total data, so that only the steering output data relevant to the angle deviation compensation is used in the ensuing comparing step.

According to at least one exemplary embodiment, said steering output data is collected by a local control unit in the vehicle, wherein said component wear data is stored in a central control unit remotely from the vehicle, wherein said step of acquiring the steering output data comprises receiving at the central control unit said steering output data collected by the local control unit, wherein said step of comparing is performed by the central control unit. This has the benefit that a fleet operator may have access to a central control unit which may communicate with local control units in different vehicles. Thus, a fleet operator may obtain predictions on when it is time to call in one of the vehicles of a fleet of vehicles, for maintenance and/or for replacement of one or more components of that vehicle.

According to at least one exemplary embodiment, said power spectrum is generated by the local control unit and then received by the central control unit from the local control unit. It is advantageous if the amount of data traffic is held low and therefore advantageous to send a calculated result rather than a large amount of raw data.

According to a second aspect of the invention, there is provided a computer program comprising program code means for performing the steps of the method according to the first aspect (including any embodiment thereof) when said program is run on a computer.

According to a third aspect of the invention, there is provided a computer readable medium carrying a computer program comprising program code means for performing the steps of the method according to the first aspect (including any embodiment thereof) when said program product is run on a computer.

According to a fourth aspect of the invention, there is provided a central control unit for predicting maintenance/replacement period for a component of a vehicle, the central control unit being configured to perform the steps of the method according to the first aspect (including any embodiment thereof).

According to a fifth aspect of the invention, there is provided a system for predicting maintenance/replacement period for a component of a vehicle, the vehicle comprising a power-assisted steering system including a steering actuator configured to assist in steering the vehicle at least as compensation for angular deviations of the road wheels caused by road disturbances, the system comprising a central control unit configured to:

acquire over time steering output data indicative of a magnitude and/or frequency of assisted steering as compensation for angular deviations of the road wheels caused by road disturbances, compare the acquired steering output data with stored component wear data, the stored component wear data being indicative of when maintenance/replacement of the component is due based on wear caused by road disturbances, and determine, based on the comparison of the acquired steering output data and the stored component wear data, whether or not maintenance/replacement of the component is due.

The advantages of the various embodiments of the fifth aspect are largely analogous to the advantages of the corresponding embodiments of the first aspect, and for the sake of brevity, will not be repeated here. Exemplary embodiments of the system of the fifth aspect are defined in the claims.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
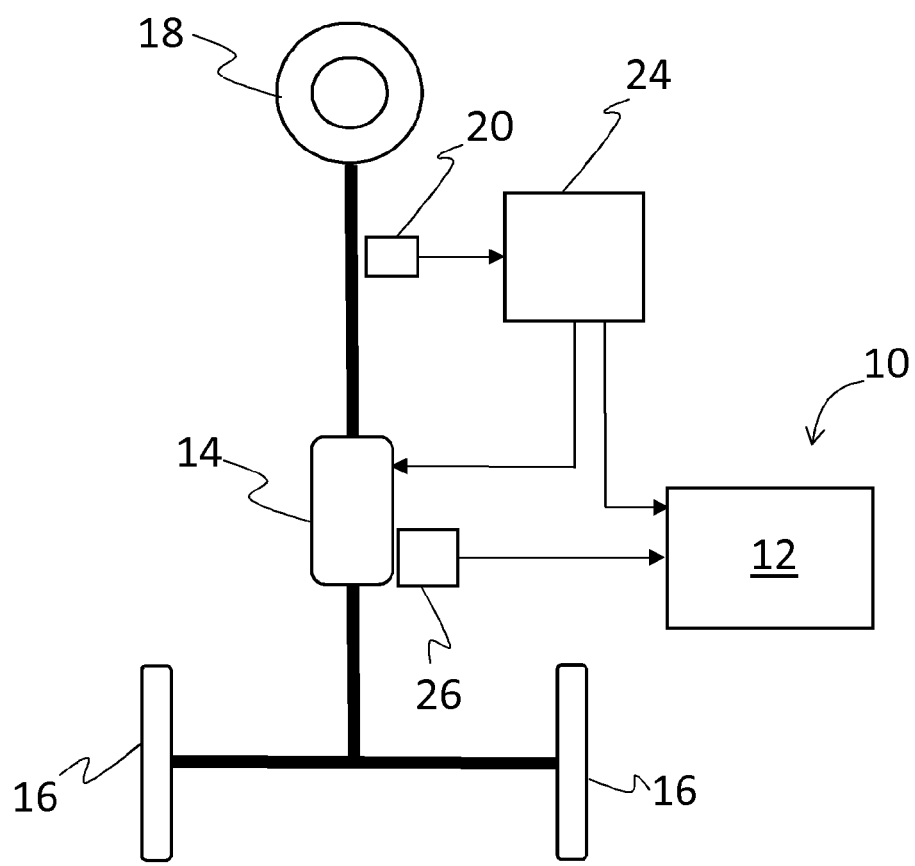
FIG. 1 is a schematic illustration of an implementation of a system according to at least one exemplary embodiment of the invention.

FIG. 1 is a schematic illustration of an implementation of a system 10 according to at least one exemplary embodiment of the invention. The system 10 is for predicting maintenance/replacement period for a component of a vehicle. The system comprises a central control unit 12.

The vehicle for which the system 10 may be implemented comprises a power-assisted steering system including a steering actuator 14 configured to assist in steering the vehicle at least as compensation for angular deviations of the road wheels 16 caused by road disturbances. The steering system as such may be configured in various ways, and is not part of the prediction system 10 of the present invention, and therefore only a brief general overview of an example of such a steering system is given below for explanatory purpose.

In addition to compensate for angular deviations of the road wheels 16, the steering actuator 14 may also be configured to assist in steering the vehicle in dependence of a desired steering activity by a driver, i.e. when the driver controls a steering wheel 18 or the like. A steering sensor 20 may be provided to detect the desired steering activity. The steering sensor 20 may send driver input signals to a steering regulator 24 which is part of the power-assisted steering system. The steering regulator 24 calculates and sends regulating signals for the operation of the steering actuator 14.

Also, the steering sensor 20, or a separate sensor, may detect angular deviations of the road wheels 16, for instance due to one or more of the road wheels 16 of the vehicle running over bumps or other rough road features. The steering regulator 24, or a separate regulator, receives such signals related to non-desired angular deviations and may then control the steering actuator 14 to correct the direction of the road wheels 16 and to compensate for the angular deviation.

The operation of the steering actuator 14 may be monitored by an actuator sensor 26. For instance, the steering actuator 14 may comprise an electric motor, and the actuator sensor 26 may measure the torque applied by the electric motor.

According to the present invention, there is provided a system 10 for predicting maintenance/replacement period for a component of a vehicle, the vehicle comprising a power-assisted steering system including a steering actuator 14 configured to assist in steering the vehicle at least as compensation for angular deviations of the road wheels 16 caused by road disturbances, wherein the system comprising a central control unit 12. In the embodiment illustrated in FIG. 1 the central control unit 12 is provided on the actual vehicle. In the embodiment illustrated in FIG. 2, the central control unit 12 is provided remotely and communicates with a local control unit 28 provided on the vehicle.

Figure 2:
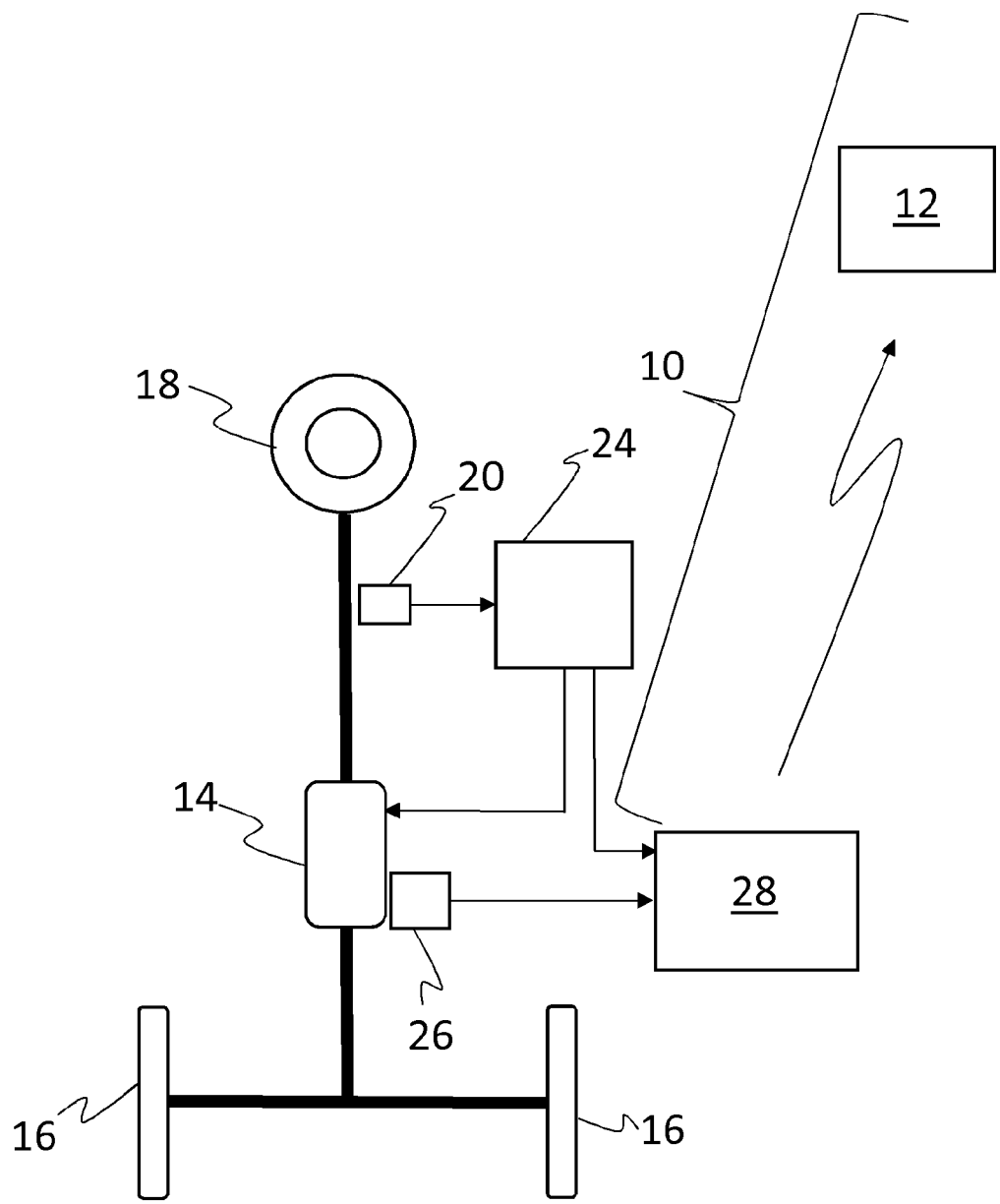
FIG. 2 is a schematic illustration of an implementation of a system according to at least another exemplary embodiment of the invention.

In either one of the embodiments of FIG. 1 and FIG. 2, the central control unit 12 is configured to:

acquire over time steering output data indicative of a magnitude and/or frequency of assisted steering as compensation for angular deviations of the road wheels 16 caused by road disturbances, compare the acquired steering output data with stored component wear data, the stored component wear data being indicative of when maintenance/replacement of the component is due based on wear caused by road disturbances, and determine, based on the comparison of the acquired steering output data and the stored component wear data, whether or not maintenance/replacement of the component is due.

If a positive determination is made, the central control unit 12 may send a maintenance/replacement signal or message. For instance, it may be a visual, audible and/or tactile signal. It may be a text message sent to a local computer/screen in the driver's compartment of the vehicle or in the facilities of a fleet operator etc. The signal or message may be sent to any other suitable devices, such as hand held devices, e.g. cellular phones, etc.

In FIG. 1 the actuator sensor 26 is connected to a central control unit 12 which thus receives information related to the operation of the steering actuator 14. The central control unit 12 may also receive information from the steering regulator 24. The central control unit 12 may filter out steering data which comes from driver input (e.g. steering wheel 18), so that from the total work of the steering actuator 14, only steering output data which is due to compensation for angular deviation of one or more of the road wheels 16, is taken into account for further processing.

In FIG. 2 the actuator sensor 26 is instead connected to the local control unit 28. The central control unit 12 and the local control 28 are both included in the prediction system of exemplary embodiments of the present invention. In FIG. 2, it is the local control unit 28 that receives information from the steering regulator 24, and in this case either one of the central control unit 12 or the local control unit 28 may filter out steering data which comes from driver input, so that from the total work of the steering actuator 14, only steering output data which is due to compensation for angular deviation of one or more of the road wheels 16, is taken into account for further processing. It may, however, be advantageous to have the filtering functionality in the local control unit 28, as this means that less data needs to be sent wirelessly to the central control unit 12.

The local control unit 28 in FIG. 2 may thus communicate the steering output data wirelessly to the remotely located central control unit 12, which may be located in a location from where a vehicle fleet operator may monitor a plurality of vehicles in a fleet. However, other locations are also possible, the central control unit 12 may, for instance, be located at a facility of the vehicle manufacturer, a service centre, an insurance company or any other remote location where it may be appropriate to monitor the vehicle in order to predict the maintenance/replacement period for one or more components of the vehicle.

Figure 3:
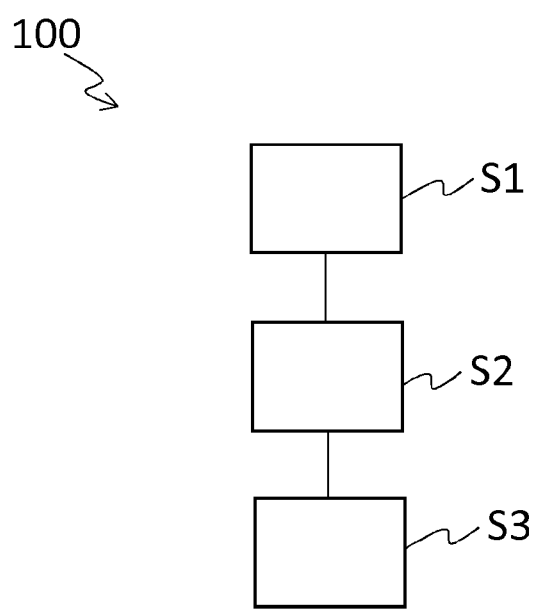
FIG. 3 is a schematic diagram of a method according to at least one exemplary embodiment of the invention.

FIG. 3 is a schematic diagram of a method 100 according to at least one exemplary embodiment of the invention. There is thus provided a method 100 for predicting maintenance/replacement period for a component of a vehicle, the vehicle comprising a power-assisted steering system including a steering actuator configured to assist in steering the vehicle at least as compensation for angular deviations of the road wheels caused by road disturbances, the method comprising:
  in a first step S1, acquiring over time steering output data indicative of a magnitude and/or frequency of assisted steering as compensation for angular deviations of the road wheels caused by road disturbances,
  in a step S2, comparing the acquired steering output data with stored component wear data, the stored component wear data being indicative of when maintenance/replacement of the component is due based on wear caused by road disturbances, and
  in a step S3, determining, based on the comparison of the acquired steering output data and the stored component wear data, whether or not maintenance/replacement of the component is due.

The first step S1 means that the steering output data is collected during a prolonged time period, not just at a single point in time. Thus, the expression "over time", means that the first step may be carried out during normal operation of a vehicle driving from a start to a destination and/or for a plurality of routes distributed over days, weeks, months etc. The acquiring of the steering output data does not necessarily occur continuously, but may be sampled at certain time intervals, for instance one or more samples may be taken every millisecond, every hundreds of a second, or every tenth of a second, etc. or at other suitable time intervals.

It should be noted that the steering output data indicative of a magnitude and/or frequency of assisted steering as compensation for angular deviations of the road wheels caused by road disturbances may be pure data without any noise or may be acquired together with other data, such as data emanating from power-assisted driving in response to a driver's input. In the latter case such additional data may be filtered out to so that only the relevant steering output data related to the road disturbance compensation is used in the ensuing steps of the method. Thus, the first step S1 of acquiring steering output data may comprise filtering out said additional data form the total steering data.

The stored component wear data may be data which has previously been collected by other means. For instance, acceleration sensors have historically been used to collect data on how magnitude and recurrence of a vehicle component's acceleration affects its life, i.e. how it affects the time period for replacing the component or performing appropriate maintenance of the component. Such component wear data is already available to vehicle manufacturers today.

The steering output data may suitably be collected by a local control unit in the vehicle, such as the local control unit 28 in FIG. 2, wherein the component wear data may suitably be stored in the central control unit 12 remotely from the vehicle, wherein the first step S1 of acquiring the steering output data may comprise receiving at the central control unit 12 said steering output data collected by the local control unit 28, wherein the second step S2 of comparing the different sets of data may be performed by the central control unit 12.

Figure 4:
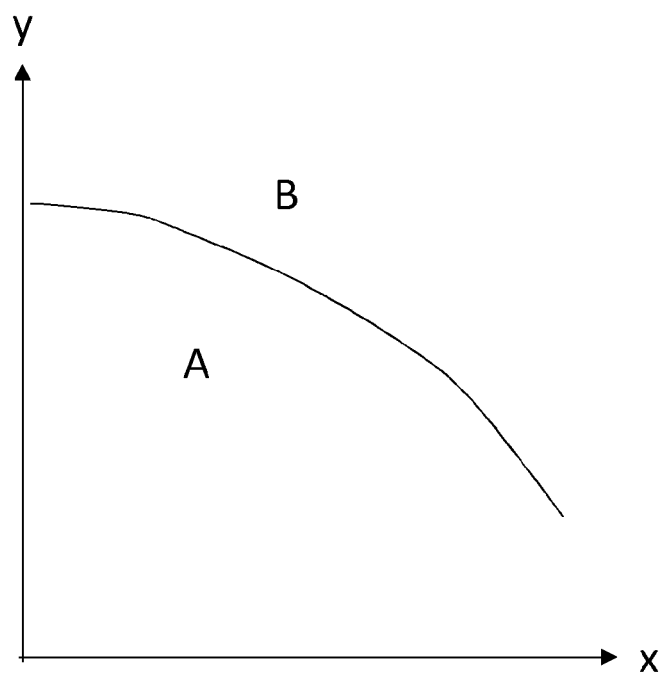
FIG. 4 is a simple exemplary graph for illustrating how acquired steering output data may be compared with stored component wear data.

FIG. 4 is a simple exemplary graph for illustrating how acquired steering output data may be compared with stored component wear data. The stored component wear data may for example be an acceleration of a component in as a function of the number of repetitions of the acceleration, and may be represented by a plotted graph, in which the x-axis of the graph represents the magnitude of the acceleration (e.g. divided in various acceleration ranges), and the y-axis represents the recurrence (e.g. number of occurrences in each acceleration range). As long as the acquired steering output data corresponds to values below the plotted graph, i.e. in area A, maintenance/replacement is not yet necessary. However, if the acquired steering output data corresponds to one or more values which lie above the plotted graph, i.e. in area B, then it may be determined that it is time for maintenance/replacement of the component which is represented by the plot. The exemplary illustration of FIG. 4 shows that this particular component, may be subjected to many low acceleration repetitions, but fewer high acceleration repetitions, before a threshold along the plotted curve is reached. Different components may, of course, have different plots, depending on their sensitivity to the forces that they are subjected to when the vehicle travels on rough roads. It should be noted that FIG. 4 is just one simple example shown for explanatory purposes, and it should be understood that the comparing step S2 and the determining step S3 in the method of FIG. 3 may be performed in numerous other ways.

The stored component wear data may include one or more thresholds of a first parameter value. For instance, in FIG. 4, the thresholds could be represented by the plotted graph. According to exemplary embodiments, the second parameter values generated by the steering actuator (e.g. magnitude of torque of an electric motor of the steering actuator) may be converted into first parameter values. For instance, from the torque value, which represents the compensation for the angular deviation of the road wheels due to road disturbances, the deviation angle may be obtained. In turn, from the deviation angle, the magnitude of the road disturbance may be obtained, for instance the size of a bump, which in turn may give a value of the acceleration of a component. Thus, when the converted value exceeds said one or more thresholds it is determined in step S3, that maintenance/replacement of the component is due.

For even more accurate prediction of the maintenance/replacement period, the conversion of second parameter values into first parameter values may additionally be performed as a function of the velocity of the vehicle at the time the second parameter value was generated. Accordingly, the velocity data indicative of the velocity of the vehicle may be acquired over time. When a vehicle runs at a high speed the roughness of the road will affect the components of the vehicle more than if the vehicle runs at a low speed.

According to at least one exemplary embodiment the first parameter value is at least one of vertical, lateral and longitudinal acceleration of the component as a function of number of repetitions. For instance, each one of these acceleration directions may have its own threshold or thresholds in the stored component wear data. Thus, for each component, it would be conceivable to represent such thresholds with three different acceleration plots, one for each acceleration direction. However, rather than treating the acceleration directions separately from each other, it is conceivable, to give them different weight. For instance, one component may be more sensitive to vertical acceleration than lateral acceleration, while for another component it may be the opposite. In step S2 and step S3, of FIG. 3, the comparison of the acquired steering output data with the stored component wear data may thus include one threshold for each acceleration direction and/or a combined threshold (in which the accelerations in the different direction are given appropriate weight).

As mentioned above, the generated second parameter value may be a measured torque value given by an electric motor of the steering actuator 14, such as exemplified in the arrangement of illustrated in FIG. 2. Although measuring the torque is a practical and accurate way of obtaining information on road disturbances, other alternatives would be conceivable. For instance, the second parameter value could be an angle sensor (such as an optical or electromagnetic sensor) which directly measures the angle of the road wheels, wherein a comparison with the desired steering input from the driver, gives information about the discrepancy caused by road disturbance.

According to at least one exemplary embodiment, the method further comprises the step of determining the magnitude of torque given by the electric motor, before the step of comparing the acquired steering output data with stored component wear data. This is illustrated in FIG. 5.

Figure 5:
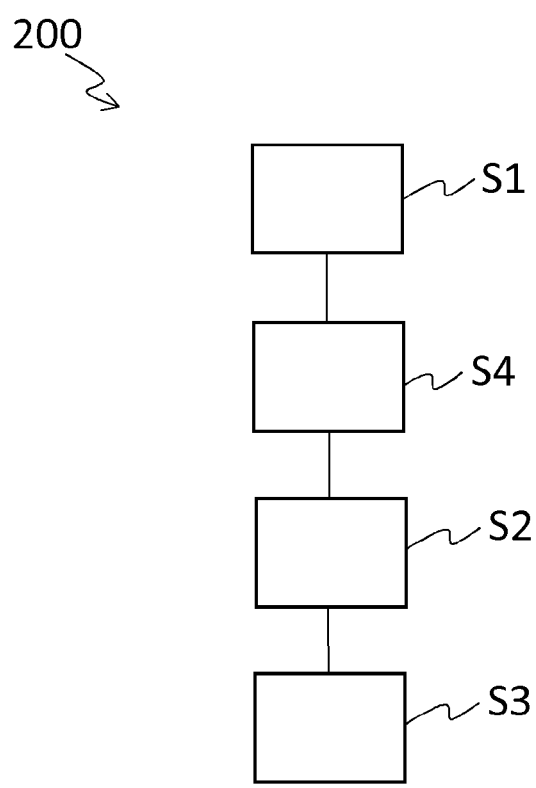
FIG. 5 is a schematic diagram of a method according to at least one exemplary embodiment of the invention.

FIG. 5 is a schematic diagram of a method 200 according to at least one exemplary embodiment of the invention. Similarly to the method 100 illustrated in FIG. 3, the present exemplary embodiment illustrates a method 200 in which steps S1-S3 are the same, but which also has the additional step S4 of determining the magnitude of the electric torque given by the electric motor, before the comparing step S2.

Said step S4 may also comprise the sub-step of generating a power spectrum by means of a frequency analysis, such as a Fourier analysis, on the torque given by the electric motor, in order to establish how much of the torque is at each frequency. Such a power spectrum may, for instance, be generated by the local control unit 28 in FIG. 2, and then received by the central control unit 12 from the local control unit 28.

Alternatively, said step S4 may comprise the sub-steps of
defining a plurality of torque ranges,
sampling the magnitude of torque given by the electric motor to obtain measured torque values,
counting the number of samples within each one of said plurality of torque ranges, in order to establish said second parameter values.

Suitably, each torque range may be converted into a corresponding acceleration range for the component in question. Thus, the number of repetitions for each torque range may be used for determining if a threshold has been reached or not (e.g. as plotted in FIG. 4).

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors, the one or more programs comprising instructions for performing the method according to any one of the above-discussed embodiments. Alternatively, according to another exemplary embodiment a cloud computing system can be configured to perform any of the method aspects presented herein. The cloud computing system may comprise distributed cloud computing resources that jointly perform the method aspects presented herein under control of one or more computer program products.

The processor(s) may be or include any number of hardware components for conducting data or signal processing or for executing computer code stored in memory. The system may have an associated memory, and the memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

The different features and steps of the embodiments may be combined in other combinations than those described.

It is to be understood that the present invention is not limited to the embodiments described above and illustrated in the drawings; rather, the skilled person will recognize that many changes and modifications may be made within the scope of the appended claims.

The invention claimed is:

1. A method for predicting a maintenance/replacement period for a component of a vehicle, the method comprising:
acquiring, by at least one control unit comprising at least one processor, steering output data generated by at least one sensor of a vehicle, the vehicle comprising a power-assisted steering system including a steering actuator configured to assist in steering the vehicle, the steering output data indicative of a magnitude and/or a frequency of assisted steering as compensation for angular deviations of road wheels of the vehicle caused by road disturbances,
comparing, by the at least one control unit, the acquired steering output data with stored component wear data, the stored component wear data being indicative of when maintenance/replacement of the component is due based on wear caused by road disturbances, and
determining, by the at least one control unit and based on the comparison of the acquired steering output data and the stored component wear data, whether maintenance/replacement of the component is due;
wherein the steering actuator is configured to additionally assist in steering the vehicle in dependence of a desired steering activity by a driver, wherein the steering output data is a subset of total steering data which additionally includes data indicative of an assisted steering in dependence of a desired steering activity by a driver, wherein the acquiring by the at least one control unit, of the steering output data comprises filtering out the additional data from the total steering data;
wherein the stored component wear data includes one or more thresholds of a first parameter value,
wherein the steering output data includes first parameter values which have been converted from second parameter values generated by the steering actuator and are indicative of assisted steering as compensation for road disturbances,
wherein the comparing, by the at least one control unit, of the acquired steering output data with stored component wear data comprises comparing the first parameter values of the steering output data with the one or more thresholds, and
wherein the determining by the at least one control unit, comprises determining that maintenance/replacement of the component is due when one or more of the converted first parameter values exceeds the one or more thresholds.

2. The method of claim 1, wherein the first parameter values are at least one of vertical, lateral and longitudinal acceleration of the component as a function of number of repetitions.

3. The method of claim 1, wherein the generated second parameter value is a measured torque value given by an electric motor of the steering actuator to compensate for road disturbances.

4. The method of claim 3, further comprising determining a magnitude of torque given by the electric motor, before comparing the acquired steering output data with the stored component wear data.

5. The method of claim 4, further comprising generating by the at least one control unit, a power spectrum by means of a frequency analysis on the torque given by the electric motor, in order to establish how much of the torque is at each frequency.

6. The method of claim 4, further comprising:
defining by the at least one control unit, a plurality of torque ranges,
sampling by the at least one control unit, the magnitude of torque given by the electric motor to obtain measured torque values, and
counting by the at least one control unit, a number of samples within each one of the plurality of torque ranges, in order to establish the second parameter values.

7. The method of claim 1, further comprising acquiring velocity data indicative of velocity of the vehicle, wherein the conversion of the second parameter values into the first parameter values is performed by the at least one control unit as a function of the velocity of the vehicle at the time the second parameter value was generated.

8. The method of claim 1, wherein the at least one control unit comprises a local control unit in the vehicle and a central control unit remote from the vehicle, and the steering output data is collected by the local control unit, wherein the component wear data is stored in the central control unit, wherein the acquiring of the steering output data comprises receiving at the central control unit the steering output data collected by the local control unit, and wherein the comparing of the acquired steering output data with the storage component wear data is performed by the central control unit.

9. The method of claim 1,
further comprising generating, by the at least one control unit, a power spectrum by means of a frequency analysis on the torque given by the electric motor, in order to establish how much of the torque is at each frequency;
wherein the at least one control unit comprises a local control unit in the vehicle and a central control unit remote from the vehicle;
wherein the steering output data is collected by the local control unit, wherein the component wear data is stored in the central control unit, wherein the acquiring of the steering output data comprises receiving at the central control unit the steering output data collected by the local control unit, and wherein the comparing of the acquired steering output data with the storage component wear data is performed by the central control unit; and
wherein the power spectrum is generated by the local control unit and then received by the central control unit from the local control unit.

10. A system for predicting a maintenance/replacement period for a component of a vehicle, the vehicle comprising a power-assisted steering system including a steering actuator configured to assist in steering the vehicle at least as compensation for angular deviations of road wheels caused by road disturbances, the system comprising at least one control unit comprising at least one processor, the at least one control unit being configured to perform each of the following:
acquire steering output data generated by at least one sensor, the steering output data being indicative of a magnitude and/or frequency of assisted steering as compensation for angular deviations of the road wheels caused by road disturbances,
compare the acquired steering output data with stored component wear data, the stored component wear data being indicative of when maintenance/replacement of the component is due based on wear caused by road disturbances, and determine, based on the comparison of the acquired steering output data and the stored component wear data, whether maintenance/replacement of the component is due;

wherein the steering actuator is configured to additionally assist in steering the vehicle in dependence of a desired steering activity by a driver, wherein the steering output data is a subset of total steering data which additionally includes data indicative of an assisted steering in dependence of a desired steering activity by a driver, wherein the at least one unit is configured to filter out the additional data from the total steering data, wherein the stored component wear data includes one or more thresholds of a first parameter value, wherein the steering output data includes first parameter values which have been converted from second parameter values generated by the steering actuator and being indicative of an assisted steering as compensation for road disturbances, and wherein the at least one control unit is configured to compare the first parameter values of the steering output data with the one or more thresholds, and to determine that maintenance/replacement of the component is due when one or more of the converted first parameter values exceeds the one or more thresholds.

11. The system of claim 10, wherein the at least one control unit comprises a central control unit located remotely from the vehicle and a local control unit located in the vehicle for communicating with the central control unit.

12. The system of claim 11, wherein the component wear data is stored in the central control unit, wherein the local control unit is configured to collect the steering output data, wherein the central control unit is configured to acquire the steering output data collected by the local control unit.

13. The system of claim 10, wherein the first parameter values are at least one of vertical, lateral, and longitudinal acceleration of the component as a function of number of repetitions.

14. The system of claim 10, wherein the generated second parameter value is a measured torque value given by an electric motor of the steering actuator to compensate for road disturbances.

15. The system of claim 14, wherein the at least one control unit is configured to determine a magnitude of torque given by the electric motor.

16. The system of claim 15, wherein the at least one control unit is configured to generate a power spectrum by means of a frequency analysis on the torque given by the electric motor, in order to establish how much of the torque is at each frequency.

17. The system of claim 16, wherein the local control unit is configured to generate the power spectrum and then transmit the power spectrum to the central control unit.

18. The system of claim 15, wherein the at least one control unit is configured to sample the magnitude of torque given by the electric motor to obtain measured torque values, and to count a number of samples within each one of a plurality of defined torque ranges, in order to establish the second parameter values.

19. The system of claim 10, wherein the at least one control unit is configured to acquire velocity data indicative of a velocity of the vehicle, wherein the conversion of the second parameter values into the first parameter values is performed as a function of the velocity of the vehicle at the time the second parameter value was generated.

* * * * *